May 13, 1930.  P. DELAUX  1,758,561
HEADLIGHT FOR MOTOR OR LIKE VEHICLES
Filed Jan. 21, 1926
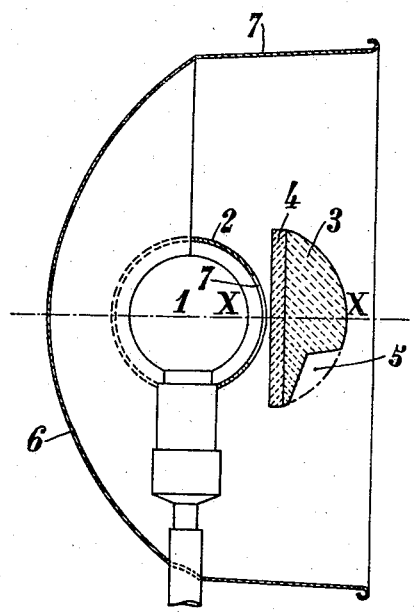
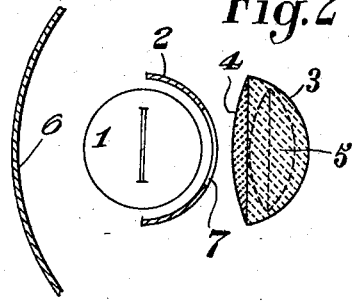

Patented May 13, 1930

1,758,561

UNITED STATES PATENT OFFICE

PAUL DELAUX, OF FONTENAY-SOUS-BOIS, FRANCE, ASSIGNOR TO SOCIÉTÉ ANONYME: SOCIÉTÉ DES PHARES ET EQUIPMENTS ELECTRIQUES OF FONTENAY-SOUS-BOIS, FRANCE, A COMPANY OF FRANCE

HEADLIGHT FOR MOTOR OR LIKE VEHICLES

Application filed January 21, 1926, Serial No. 82,798, and in France January 20, 1925.

The present invention refers to an improvement in headlights for automobiles and other vehicles, and has for its object to limit the height of the light pencil above the ground, and thus to avoid the dazzling which is produced by the ordinary headlights.

In the accompanying diagrammatic drawing and by way of example,

Fig. 1 shows in sectional elevation, a form of construction of the lighting apparatus forming the subject-matter of this invention.

Fig. 2 is a section made according to line X—X of the optical device.

As indicated in the foregoing, the invention resides in the combination with a source of light 1, on the one hand of a semispherical reflector 2 having its center on the said source of light 1, on the other hand of an optical device constituted by a convergent lens 3 which forms a very narrow cylindrical light pencil and which is so devised that the upper rays of the said projected bundle are strictly horizontal, the lower rays being slightly inclined downwardly. A light sheet is thus obtained the upper level of which is absolutely defined (especially if use is made as source of light 1 of an electric lamp having a horizontal rectilinear filament). Any point situated above this light sheet receives a null lighting. The very small portion of the light flux which passes above and below the optical device 3 is negligible and is, moreover, without inconvenience since it cannot reach an observer placed in front of the system.

For spreading the bundle in width, the convergent lens 3 can receive, on its plane face, a plano-cylindrical lens 4. The lenses 3 and 4 can also be integral with each other. The lower part of the convergent lens 3 can be cut in the shape of prisms 5, this having the double advantage of suppressing the divergent rays and of producing a light sheet directed downwardly.

The system described can be used in combination with a parabolic mirror 6 the focus of which coincides with the source of light 1 and which is limited to the focal plane; this reflector is extended in a nonreflecting surface 7. The semi-spherical reflector 2 is arranged in such a manner that it can be angularly moved about one of its diameters, so as to be placed between the source of light 1 and either the parabolic mirror 6 or the optical device 3.

When the semi-spherical reflector 2 is arranged between the source of light 1 and the optical device 3, all the light rays which strike it are sent back, by passing through the source 1, on to the parabolic reflector 6. Therefore, there is only a very small loss of light which is, moreover, compensated by the fact that no divergent rays are produced. If the reflector 2 is perforated with an opening 7, it allows the passage of the rays which are emitted according to the focal line and which are horizontally reflected.

These rays are therefore used in this case.

In case it is desired to avoid dazzling (passing of a car for instance), the semispherical reflector 2 is placed between the source of light 1 and the parabolic reflector 6, this reproducing the conditions of utilization above mentioned.

Claims:

1. In a headlight for automobile vehicles, a reflector, an electric lamp with a rectilinear filament arranged perpendicularly to the axis of the reflector and also positioned horizontally thereof, a plano-convex lens arranged substantially concentric with the axis of the reflector, the lower part of the planoconvex lens being cut out to form a dihedral angle the horizontal edge of which is disposed parallel to the lamp, a plano-cylindrical lens located between the light source and the plano-convex lens, the plane surfaces of the two lenses being arranged in contacting relation with each other, and a semi-spherical reflector positioned between the plano-cylindrical lens and the lamp and provided with an opening substantially concentric to the axis of the reflector.

2. In a headlight for vehicles, an electric lamp having a rectilinear filament located perpendicular to the geometric axis of the headlight and arranged horizontally thereof, a semi-spherical reflector having its center at the middle of the said rectilinear filament, a plano-convex hemispherical lens the lower part of which is cut away so as to form a concave obtuse dihedral angle, whose sides are planes, intersecting on a line parallel to the filament.

In testimony whereof I have signed my name to this specification.

PAUL DELAUX.